United States Patent
Yu et al.

(10) Patent No.: US 9,318,746 B2
(45) Date of Patent: Apr. 19, 2016

(54) POSITIVE ELECTRODE HAVING CURRENT COLLECTOR WITH CARBON LAYER FOR RECHARGEABLE LITHIUM BATTERY AND RECHARGEABLE LITHIUM BATTERY INCLUDING SAME

(75) Inventors: Dong-Hwan Yu, Yongin-si (KR); Gun-Ho Kwak, Yongin-si (KR); In-Sung Uhm, Yongin-si (KR); Bo-Ra Shin, Yongin-si (KR)

(73) Assignees: Samsung SDI Co., Ltd., Giheung-gu, Yongin-si, Gyeonggi-do (KR); ROBERT BOSCH GMBH, Stuttgart (DE)

( * ) Notice: Subject to any disclaimer, the term of this patent is extended or adjusted under 35 U.S.C. 154(b) by 795 days.

(21) Appl. No.: 13/444,004

(22) Filed: Apr. 11, 2012

(65) Prior Publication Data
US 2012/0308885 A1    Dec. 6, 2012

(30) Foreign Application Priority Data
Jun. 2, 2011 (KR) .................. 10-2011-0053422

(51) Int. Cl.
*H01M 4/66* (2006.01)
*H01M 4/02* (2006.01)

(52) U.S. Cl.
CPC .............. *H01M 4/667* (2013.01); *H01M 4/661* (2013.01); *H01M 4/663* (2013.01); *H01M 2004/021* (2013.01); *H01M 2004/028* (2013.01)

(58) Field of Classification Search
CPC ....... H01M 4/64; H01M 4/663; H01M 4/661; H01M 4/667
See application file for complete search history.

(56) References Cited

U.S. PATENT DOCUMENTS 4,632,777 A * 12/1986 Nicholson ................ H01B 1/24
252/511
2002/0045102 A1  4/2002 Jung et al.
(Continued)

FOREIGN PATENT DOCUMENTS

JP    2002075446    3/2002
JP    2002358956    12/2002
(Continued)

OTHER PUBLICATIONS

Korean Office Action issued Sep. 25, 2012 in connection with Korean Patent Application Serial No. 10-2011-0053422 and Request for Entry of the Accompanying Office Action attached herewith.
(Continued)

*Primary Examiner* — Rena L Dye
(74) *Attorney, Agent, or Firm* — Robert E. Bushnell, Esq.

(57) ABSTRACT

Disclosed are a positive electrode for a rechargeable lithium battery and a rechargeable lithium battery including the same, and the positive electrode includes a current collector including a carbon layer disposed on a substrate; and a positive active material layer disposed on the current collector, wherein the carbon layer has a loading level of 0.5 g/m² to 3 g/m². The effects of the carbon layer include improving the high power characteristics and the power density by decreasing the internal resistance of an electrode, and to improve the power density by providing uniform current to the positive electrode. The carbon layer may have a thickness of about 1 μm to about 2 μm. The carbon layer may include a carbon-based material of artificial graphite, natural graphite, carbon black, acetylene black, ketjen black, denka black, or combinations thereof.

11 Claims, 2 Drawing Sheets

(56) References Cited

U.S. PATENT DOCUMENTS

| | | |
|---|---|---|
| 2007/0026293 A1 | 2/2007 | Kim et al. |
| 2007/0212611 A1 | 9/2007 | Nishijima et al. |
| 2008/0226986 A1* | 9/2008 | Nakahara et al. ............. 429/213 |
| 2010/0075225 A1* | 3/2010 | Wilkins et al. ................ 429/212 |
| 2011/0129730 A1* | 6/2011 | Kasai et al. ................... 429/213 |
| 2011/0171537 A1 | 7/2011 | Takeuchi et al. |

FOREIGN PATENT DOCUMENTS

| | | |
|---|---|---|
| KR | 1020020094530 | 12/2002 |
| KR | 1020050048453 | 5/2005 |
| KR | 100717790 B | 5/2007 |
| WO | WO 2010002002 A1 * | 1/2010 |

OTHER PUBLICATIONS

Korean Office Action issued on Mar. 20, 2013 in connection with Korean Patent Application No. 10-2011-0053422 and Request for Entry of the Accompanying Office Action attached herewith.

* cited by examiner

POSITIVE ELECTRODE HAVING CURRENT COLLECTOR WITH CARBON LAYER FOR RECHARGEABLE LITHIUM BATTERY AND RECHARGEABLE LITHIUM BATTERY INCLUDING SAME

CLAIM OF PRIORITY

This application claims priority to and the benefit of Korean Patent Application No. 10-2011-0053422 filed in the Korean Intellectual Property Office on Jun. 2, 2011, the entire contents of which are incorporated herein by reference.

BACKGROUND OF THE INVENTION

1. Field of the Invention

This disclosure relates to a positive electrode for a rechargeable lithium battery and a rechargeable lithium battery including the same.

2. Description of the Related Art

Lithium rechargeable batteries have recently drawn attention as a power source for small portable electronic devices. They use an organic electrolyte solution and thereby have twice or more the discharge voltage of a conventional battery using an alkaline aqueous solution, and accordingly have high energy density.

For positive active materials of a rechargeable lithium battery, lithium-transition element composite oxides being capable of intercalating lithium, such as $LiCoO_2$, $LiMn_2O_4$, $LiNi_{1-x}Co_xO_2$ (0<x<1), and so on, have been researched.

As for negative active materials of a rechargeable lithium battery, various carbon-based materials such as artificial graphite, natural graphite, and hard carbon, which can intercalate and deintercalate lithium ions. However, recently there has been research into non-carbon-based negative active materials such as Si in accordance with need for stability and high-capacity.

SUMMARY OF THE INVENTION

One embodiment of the present invention provides a positive electrode for a rechargeable lithium battery having improved high-rate capability, power density, and cycle-life characteristics.

Another embodiment of the present invention provides a rechargeable lithium battery including the positive electrode.

According to one embodiment of the present invention, a positive electrode for a rechargeable lithium battery is provided comprising a current collector including a carbon layer disposed on a substrate; and a positive active material layer disposed on the current collector, and the carbon layer has a loading level of 0.5 $g/m^2$ to 3 $g/m^2$.

The carbon layer may have a thickness of 1 μm to 2 μm.

The carbon layer may have a loading level of 1 $g/m^2$ to 3 $g/m^2$.

The carbon layer may include a carbon-based material of artificial graphite, natural graphite, carbon black, acetylene black, ketjen black, denka black, or combinations thereof.

The positive active material layer may include a positive active material that reversibly intercalates and deintercalates lithium ions.

The substrate may include an aluminum substrate.

According to another embodiment of the present invention, a rechargeable lithium battery including the positive electrode; a negative electrode including a negative active material; and an electrolyte is provided.

The rechargeable lithium battery may be a high power battery.

Hereinafter, further embodiments of the present invention will be described in detail.

The positive electrode for a rechargeable lithium battery shows high-rate capability, and may be used for a high power battery.

DETAILED DESCRIPTION OF THE INVENTION

Figure 1:
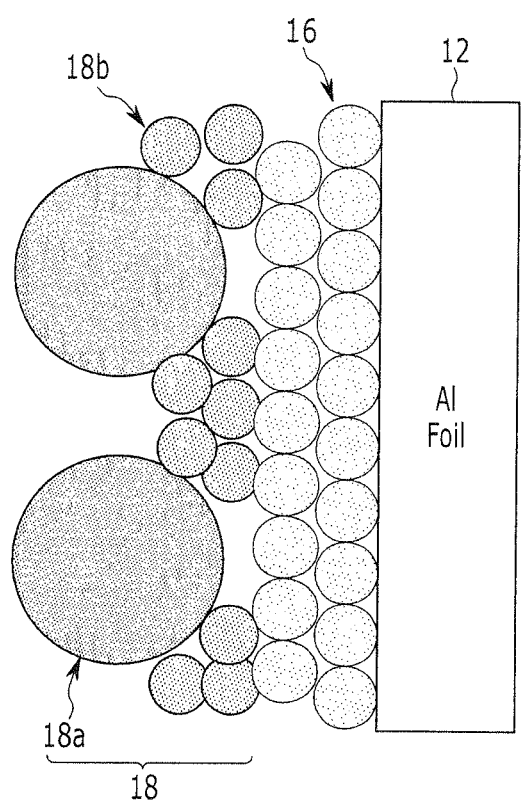
FIG. 1 is a schematic view of a positive electrode according to one embodiment.

Exemplary embodiments of the present invention will hereinafter be described in detail. However, these embodiments are only exemplary, and the present invention is not limited thereto.

The positive electrode for a rechargeable lithium battery according to one embodiment of the present invention includes a current collector including a carbon layer disposed on a substrate; and a positive active material layer disposed on the current collector.

The carbon layer may have a loading level of approximately 0.5 $g/m^2$ to approximately 3 $g/m^2$, for example, a loading level of about 1 $g/m^2$ to about 3 $g/m^2$. When the carbon layer has a loading level of less than about 0.5 $g/m^2$, it may not achieve the desired effects of the carbon layer; on the other hand, when the carbon layer has the loading level of more than about 3 $g/m^2$, the carbon layer is too thick to prevent the delamination of the carbon layer and makes it difficult to provide high-capacity.

The effects of the carbon layer include improving the high power characteristics and the power density by decreasing the internal resistance of an electrode, and to improve the power density by providing uniform current to the positive electrode. In addition, it may enhance the binding property between the positive electrode current collector and the current collector to improve the cycle-life characteristics.

When the current collector including a carbon layer disposed on a substrate is applied onto a negative electrode, it may not achieve any significant effects.

The carbon layer may have a thickness of about 1 μm to about 2 μm. When the carbon layer has a thickness within this range, it may achieve the desired effects of a carbon layer.

The carbon layer may include a carbon-based material of artificial graphite, natural graphite, carbon black, acetylene black, ketjen black, denka black, or combinations thereof.

The current collector may be obtained by mixing a carbon-based material and a binder in a solvent to provide a carbon liquid and coating the carbon liquid onto a substrate. The carbon-based material may include a carbon-based material of artificial graphite, natural graphite, carbon black, acetylene black, ketjen black, denka black, or combinations thereof, and the binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, polyacrylic acid imide, polyimide, polyacrylic acid, and the like.

The carbon-based material and the binder may be mixed in a weight ratio of about 70:30 to about 85:15. When the carbon-based material and the binder are mixed within this range, problems of increase in resistance do not occur since the binder amount is enough to provide appropriate binding properties, so it may not cause an increase in resistance. Accordingly, when the mixing ratio of carbon-based material and binder is out of this range, for example in the case where the binder amount is less than the range, the binding property is deteriorated and increases the resistance; on the other hand, when it is in excess of the range, the resistance may be increased due to the increase in the amount of binder.

The solvent includes N-methylpyrrolidone and the like, but is not limited thereto.

The positive active material layer may include a positive active material of a compound capable of reversibly intercalating and deintercalating lithium (lithiated intercalation compound). According to one embodiment, it does not include a sulfur-based compound, for example, $S_8$ as a positive active material which causes the oxidation-reduction of sulfur during the charge and discharge. When the positive active material includes a lithiated intercalation compound, it may decrease the internal resistance by employing a substrate formed with a carbon layer as an electrode current collector. Thereby, it may improve high-rate capability and output characteristics and improve output characteristic by providing uniform current. The effect may be not obtained in a lithium-sulfur battery using a positive active material of sulfur-based compound.

Examples of the positive active material include compounds represented by the following chemical formulas. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0 \leq b \leq 0.5$, $0 \leq c \leq 0.05$); $Li_aE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$.

In the above chemical formulas, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and combination thereof; T is selected from the group consisting of F, S, P and combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The positive active material may include the positive active material with a coating layer, or a compound of the active material and the active material coated with the coating layer. The coating layer may include at least one coating element compound selected from the group consisting of an oxide of the coating element, a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, or mixtures thereof. The coating process may include any conventional process as long as it does not cause any side effects on the properties of the positive active material (e.g., spray coating, immersing), which is well known to persons having ordinary skill in this art, so a detailed description thereof is omitted.

The substrate may be an aluminum substrate.

FIG. 1 schematically shows a positive electrode for a rechargeable lithium battery according to one embodiment. As shown in FIG. 1, the positive electrode 10 includes a substrate 12, a carbon layer 16, and a positive active material layer 18.

In addition, the positive active material layer 18 includes a positive active material 18a, a conductive material 18b, and a binder (not shown). In FIG. 1, the positive active material layer 18 is partially shown. Generally, the conductive material 18b surrounds the positive active material 18a.

In the positive active material layer, the positive active material may be included in an amount of about 90 wt % to about 98 wt % based on the total weight of the positive active material layer.

The binder and conductive material may be included in amounts of about 1 wt % to about 5 wt % based on the total weight of the positive active material layer, respectively.

The binder improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, styrene-butadiene rubber, acrylated styrene-butadiene rubber, an epoxy resin, nylon, and the like, but is not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as a polyphenylene derivative and the like; or mixtures thereof.

According to another embodiment of the present invention, a rechargeable lithium battery includes the positive electrode, a negative electrode, and an electrolyte. The rechargeable lithium battery is a battery including the positive electrode according to one embodiment and is usefully applied to a high power battery since the current collector including a carbon layer disposed on a substrate is used to improve high-rate capability and power density. As a result, it may be usefully applied to the field requiring high power such as automobile and so on.

A "high power" battery as described herein means a battery capable of delivering between 30 watt-hours per kilogram to 100 kilowatt-hours per kilogram. The battery may also deliver 50 kilowatt-hours per kilogram to 100 kilowatt-hours per kilogram.

The negative electrode includes a current collector and a negative active material layer disposed on the current collector, and the negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, mesophase pitch carbonized products, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ ($0<x<2$), a Si-Q alloy (where Q is an element selected from the group consisting of an alkali metal, an alkaline-earth metal, a group 13 element, a group 14 element, a group 15 element, a group 16 element, a transition element, a rare earth element, and combinations thereof, and is not Si), Sn, $SnO_2$, a Sn—R alloy (where R is an element selected from the group consisting of an alkali metal, an alkaline-earth metal, a group 13 element, a group 14 element, a group 15 element, a group 16 element, a transition element, a rare earth element, and combinations thereof and is not Sn), or mixtures thereof. At least one of these materials may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, and the like.

In the negative active material layer, the negative active material may be included in an amount of about 95 wt % to about 99 wt % based on the total weight of the negative active material layer.

The negative active material layer includes a binder, and optionally a conductive material. The negative active material layer may include the binder in an amount of about 1 wt % to about 5 wt % based on the total weight of the negative active material. In addition, when the negative active material layer further includes a conductive material, it may include about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder may include a non-water-soluble binder, a water-soluble binder, or combinations thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth) acrylic acid alkyl ester, or combinations thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkali metal may be sodium (Na), potassium (K), or lithium (Li). The cellulose-based compound may be included in an amount of about 0.1 to about 3 parts by weight based on 100 parts by weight of the binder.

The positive electrode and negative electrode are fabricated by preparing an active material composition through mixing an active material, a binder, and selectively a conductive material in a solvent, and then coating the active material composition on a current collector. The electrode manufacturing method is well known, and thus is not described in detail in the present specification. Examples of the solvent, in the case of using a non-water-soluble binder, may include an organic solvent such as N-methylpyrrolidone, and in the case of using a water-soluble binder, may include water, but is not limited thereto.

In a rechargeable lithium battery according to one embodiment, an electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethyipropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethyl acetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may include a mixture of a cyclic carbonate and a linear carbonate. The cyclic carbonate and the linear carbonate are mixed together in a volume ratio of 1:1 to 1:9. When the mixture is used as an electrolyte, the electrolyte performance may be enhanced.

In addition, the non-aqueous organic electrolyte may further include the mixture of a carbonate-based solvent and an aromatic hydrocarbon-based solvent. The carbonate-based solvent and the aromatic hydrocarbon-based solvent may be mixed together in a volume ratio ranging from 1:1 to 30:1.

The aromatic hydrocarbon-based organic solvent may be represented by the following Chemical Formula 1.

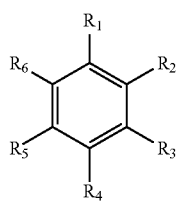

[Chemical Formula 1]

In Chemical Formula 1, $R_1$ to $R_6$ are independently selected from the group consisting of hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate, an ethylene carbonate-based compound of the following Chemical Formula 2, or a combination thereof in order to improve cycle-life.

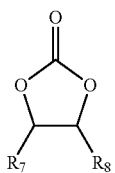

[Chemical Formula 2]

In Chemical Formula 2, $R_7$ and $R_8$ are independently selected from the group consisting of hydrogen, a halogen, a cyano group (CN), a nitro group ($NO_2$), and a C1 to C5 fluoroalkyl group, provided that at least one of $R_7$ or $R_8$ is selected from the group consisting of a halogen, a cyano group (CN), a nitro group ($NO_2$), and a C1 to C5 fluoroalkyl group, and all $R_7$ and $R_8$ are not hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle-life may be adjusted within an appropriate range.

The lithium salt is dissolved in an organic solvent, supplies lithium ions in the battery, operates the basic operation of a rechargeable lithium battery, and improves lithium ion transport between positive and negative electrodes. Examples of the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

The rechargeable lithium battery may further include a separator between the negative electrode and the positive electrode, as needed. Examples of suitable separator materials include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

Figure 2:
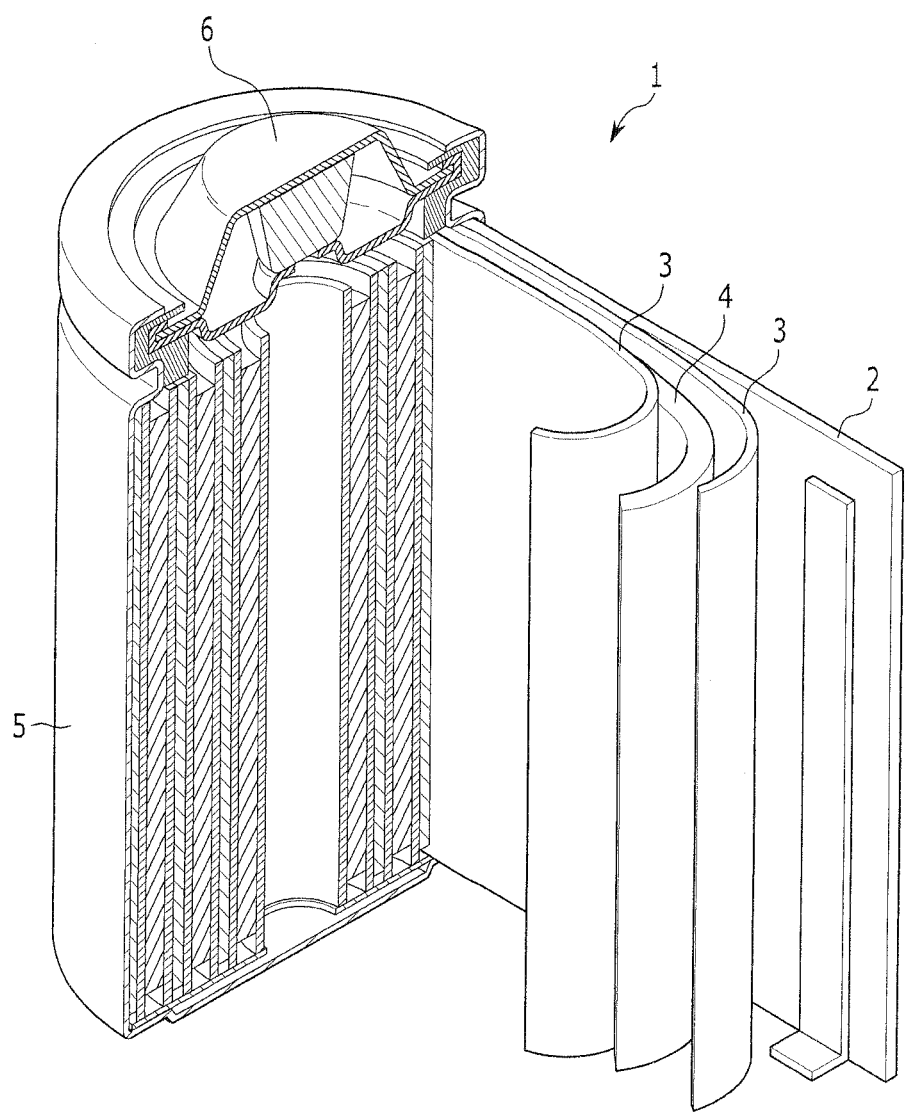
FIG. 2 is a schematic view of a rechargeable lithium battery according to one embodiment.

FIG. 2 provides a schematic view showing representative structure of a rechargeable lithium battery according to one embodiment. As shown in FIG. 2, the rechargeable lithium battery 1 includes a battery case 5 including a positive electrode 2, a negative electrode 4, a separator 3 interposed between the positive electrode 2 and the negative electrode 4, an electrolyte impregnated therein, and a sealing member 6 sealing the battery case 5.

The following examples illustrate the present invention in more detail. These examples, however, are not in any sense to be interpreted as limiting the scope of this invention.

Example 1

85% of denka black and 15% of polyvinylidene fluoride are dispersed in a N-methylpyrrolidone solvent to provide a carbon layer slurry. The carbon layer slurry is uniformly coated on an Al-foil and dried and compressed to provide a current collector for a positive electrode that the carbon layer is disposed on Al-foil The carbon layer has a loading level of 0.5 g/m$^2$.

90 wt % of $LiMn_2O_4$ active material, 5 wt % of graphite conductive material, and 5 wt % of polyvinylidene fluoride binder are mixed in an N-methylpyrrolidone solvent to provide a positive active material slurry.

The positive active material slurry is coated on the current collector for a positive electrode and dried and compressed to provide a positive electrode.

Example 2

A positive electrode is fabricated in accordance with the same procedure as in Example 1, except that the current collector for a positive electrode is provided by disposing a carbon layer having a loading level of 1 g/m$^2$ on an Al foil.

Example 3

A positive electrode is fabricated in accordance with the same procedure as in Example 1, except that the current collector for a positive electrode is provided by disposing a carbon layer having a loading level of 2 g/m$^2$ on an Al foil.

Example 4

A positive electrode is fabricated in accordance with the same procedure as in Example 1, except that the current collector for a positive electrode is provided by disposing a carbon layer having a loading level of 3 g/m² on an Al foil.

Comparative Example 1

A positive electrode is fabricated in accordance with the same procedure as in Example 1, except that the current collector for a positive electrode is provided by disposing no carbon layer on an Al foil.

Comparative Example 2

A positive electrode is fabricated in accordance with the same procedure as in Example 1, except that the current collector for a positive electrode is provided by disposing a carbon layer having a loading level of 0.3 g/m² on an Al foil.

Comparative Example 3

A positive electrode is fabricated in accordance with the same procedure as in Example 1, except that the current collector for a positive electrode is provided by disposing a carbon layer having a loading level of 3.5 g/m² on an Al foil.

Using each positive electrode obtained from Examples 1 to 4 and Comparative Examples 1 to 3, a negative electrode, a separator, and an electrolyte, a 18650 cylindrical rechargeable battery cell is fabricated. The negative electrode is obtained by mixing 85 wt % of graphite negative active material and 15 wt % of polyvinylidene fluoride binder in a N-methylpyrrolidone solvent to provide a negative active material slurry and coating the slurry on a copper foil and drying and compressing the same. In addition, a polyethylene/polypropylene film is used as the separator, and the electrolyte is prepared by dissolving 1 M(mol/l) of $LiPF_6$ in a mixed solvent of ethylene carbonate, ethylmethyl carbonate, and dimethyl carbonate (1:1:1 volume ratio).

The rechargeable battery is charged and discharged for one time at 0.2 C in a charge and discharge cut-off voltage of 4.2V to 3.0V, and charged and discharged at 10 C and charged and discharged at 20 C for each one time. The capacity efficiency according to charge and discharge is shown in the following Table 1.

In addition, the results of electrode conductivity of positive electrodes obtained from Examples 1 to 4 and Comparative Examples 1 to 3 are shown in the following Table 1.

TABLE 1

| | Carbon layer loading level (g/m²) | Electrode conductivity (S/cm) | Capacity efficiency (10 C/ 0.2 C) (%) | Capacity efficiency (20 C/ 0.2 C) (%) | Note |
|---|---|---|---|---|---|
| Comparative Example 1 | 0 | $5.3 \times 10^{-3}$ | 83 | 70 | |
| Comparative Example 2 | 0.3 | $5.0 \times 10^{-3}$ | 82 | 70 | |
| Example 1 | 0.5 | $8.0 \times 10^{-2}$ | 86 | 78 | |
| Example 2 | 1 | $5.0 \times 10^{-2}$ | 90 | 82 | |
| Example 3 | 2 | $2.4 \times 10^{-2}$ | 93 | 86 | |
| Example 4 | 3 | $1.0 \times 10^{-2}$ | 95 | 89 | |
| Comparative Example 3 | 3.5 | — | — | — | Separation of electrode |

In Table 1, the conductivity and capacity efficiency of Comparative Example 3 are not measured since the active material layer delaminated.

As shown in Table 1, it is understood that the positive electrodes according to Examples 1 to 4 including a current collector that the carbon layer has a loading level of 0.5 g/m² to 3 g/m² have superior capacity efficiency to Comparative Examples 1 and 2 including no carbon layer or having loading level of 0.3 g/m². Particularly, since the capacity efficiency at a high-rate of 20 C is very superior to Comparative Examples 1 and 2, it is demonstrated that it can usefully be applied to a high power battery such as a battery for an automobile.

In addition, as shown in Table 1, the electrode conductivity of positive electrodes according to Examples 1 to 4 is superior to Comparative Examples 1 and 2, so it is understood that the battery output characteristics may be also be excellent.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive electrode for a rechargeable lithium battery, comprising:
   a current collector including a carbon layer disposed on a substrate; and
   a positive active material layer disposed on the current collector,
   wherein the carbon layer includes carbon-based material and binder in a weight ratio of about 70:30 to about 85:15 and has a loading level of about 1 g/m² to about 3 g/m².

2. The positive electrode for a rechargeable lithium battery of claim 1, wherein the carbon layer has a thickness of about 1 μm to about 2 μm.

3. The positive electrode for a rechargeable lithium battery of claim 1, wherein the carbon layer comprises a carbon-based material of artificial graphite, natural graphite, carbon black, acetylene black, ketjen black, denka black, or combinations thereof.

4. The positive electrode for a rechargeable lithium battery of claim 1, wherein the positive active material layer comprises a positive active material that reversibly intercalates and deintercalates lithium ions.

5. The positive electrode for a rechargeable lithium battery of claim 1, wherein the substrate comprises aluminum.

6. A rechargeable lithium battery, comprising:
   a positive electrode comprising a current collector including a carbon layer disposed on a substrate wherein the carbon layer includes carbon-based material and binder in a weight ratio of about 70:30 to about 85:15; and a positive active material layer disposed on the current collector, wherein the carbon layer has a loading level of about 1 g/m² to about 3 g/m²;
   a negative electrode including a negative active material; and
   an electrolyte.

7. The rechargeable lithium battery of claim 6, wherein the rechargeable lithium battery is a high power battery capable of delivering between 30 watt-hours per kilogram to 100 kilowatt-hours per kilogram.

8. The rechargeable lithium battery of claim 6, wherein the carbon layer has a thickness of about 1 μm to about 2 μm.

9. The rechargeable lithium battery of claim 6, wherein the carbon layer comprises a carbon-based material of artificial graphite, natural graphite, carbon black, acetylene black, ketjen black, denka black, or combinations thereof.

10. The rechargeable lithium battery of claim 6, wherein the positive active material layer comprises a positive active material that reversibly intercalates and deintercalates lithium ions.

11. The rechargeable lithium battery of claim 6, wherein the substrate comprises aluminum.

\* \* \* \* \*